(12) United States Patent
Kanesaka

(10) Patent No.: US 10,114,243 B2
(45) Date of Patent: Oct. 30, 2018

(54) DISPLAY DEVICE HAVING A RECESS IN A FRAME

(71) Applicant: Japan Display Inc., Tokyo (JP)

(72) Inventor: Yuuichi Kanesaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 56 days.

(21) Appl. No.: 14/755,411

(22) Filed: Jun. 30, 2015

(65) Prior Publication Data

US 2016/0004131 A1    Jan. 7, 2016

(30) Foreign Application Priority Data

Jul. 1, 2014  (JP) ................................ 2014-135874

(51) Int. Cl.
*G02F 1/1333*  (2006.01)
*G02F 7/00*  (2006.01)

(52) U.S. Cl.
CPC .. *G02F 1/133308* (2013.01); *G02F 2201/503* (2013.01); *G02F 2202/22* (2013.01)

(58) Field of Classification Search
CPC combination set(s) only.
See application file for complete search history.

(56) References Cited

U.S. PATENT DOCUMENTS

| 6,411,353 | B1* | 6/2002 | Yarita | G02F 1/133308 349/150 |
| 2007/0070263 | A1* | 3/2007 | Nishimura | G02F 1/133528 349/58 |
| 2009/0033825 | A1* | 2/2009 | Fukayama | G02F 1/133308 349/58 |
| 2009/0122250 | A1 | 5/2009 | Oohira | |
| 2009/0310055 | A1* | 12/2009 | Kim | G02F 1/133528 349/58 |

FOREIGN PATENT DOCUMENTS

JP    2009-122297 A    6/2009

\* cited by examiner

*Primary Examiner* — Lauren Nguyen
(74) *Attorney, Agent, or Firm* — Typha IP LLC

(57) ABSTRACT

A display device includes a display panel including a thin film transistor substrate and a counter substrate having a transparent conductive film formed on the counter substrate, a mold frame fixing the display panel on the mold frame, a conductive rubber cushion that lies astride the counter substrate and the mold frame and is attached to both the counter substrate and the mold frame, and a metal frame, made of metal, that covers the edge of the display panel and the mold frame from above the conductive rubber cushion in a plan view. The metal frame has a recess. A first surface of the recess is lower than the surrounding thereof. A second surface the recess is higher than the surrounding thereof to be in contact with the conductive rubber cushion.

10 Claims, 5 Drawing Sheets

DISPLAY DEVICE HAVING A RECESS IN A FRAME

CROSS-REFERENCE TO RELATED APPLICATION

The present application claims priority from Japanese application JP2014-135874 filed on Jul. 1, 2014, the content of which is hereby incorporated by reference into this application.

BACKGROUND OF THE INVENTION

1. Field of the Invention

The present invention relates to a display device.

2. Description of the Related Art

Liquid crystal display devices are widely used as display devices in televisions or information communication terminals such as computers. Organic electro-luminescent (EL) display devices and micro electro mechanical systems (MEMS) display devices are also known as thin display devices.

Many of such display devices use a display panel including a thin film transistor (TFT) substrate, in which a circuit including TFTs controls the amount of light based on a grayscale value of each sub-pixel, and a counter substrate, which includes, for example, a color filter and covers the TFT substrate.

JP 2009-122297 A discloses a liquid crystal display device in which a ground pad formed on a TFT substrate and a transparent conductive film formed on a counter substrate are connected with each other via a thermo-compression bonding conductive tape.

A counter substrate such as a color filter substrate, which includes no TFT circuit, requires a transparent conductive film, such as indium tin oxide (ITO), that is formed on the surface for protection from noise and static electricity and is connected to the ground potential of a display device to remove static electricity. It requires a thermo-compression bonding step and thus raises manufacturing costs to connect the counter substrate to the conductive film, which is formed of an oxidizable metal, on the TFT substrate as disclosed in JP 2009-122297 A.

SUMMARY OF THE INVENTION

In view of the above circumstances, it is an object of the present invention to provide a display device that remove static electricity from its counter substrate more easily and stably.

Exemplary display devices to solve the above problems are as follows.

(1) A display device includes a display panel including a TFT substrate and a counter substrate having a transparent conductive film formed on the counter substrate, a mold frame fixing the display panel on the mold frame, a conductive rubber cushion that lies astride the counter substrate and the mold frame and is attached to both the counter substrate and the mold frame, and a metal frame, made of metal, that covers an edge of the display panel and the mold frame from above the conductive rubber cushion in a plan view. The metal frame has a recess that is in contact with the conductive rubber cushion on the mold frame.

(2) In the display device according to the above (1), the conductive rubber cushion may have an opening between the recess and the counter substrate in a plan view.

(3) In the display device according to the above (2), the mold frame has a protrusion extending through the opening.

DETAILED DESCRIPTION OF THE INVENTION

Embodiments of the present invention are described below with reference to the accompanying drawings. The disclosure herein is merely an example, and appropriate modifications coming within the spirit of the present invention, which are easily conceived by those skilled in the art, are intended to be included within the scope of the invention as a matter of course. The accompanying drawings schematically illustrate widths, thicknesses, shapes, or other characteristics of each part for clarity of illustration, compared to actual configurations. However, such a schematic illustration is merely an example and not intended to limit the present invention. In the present specification and drawings, some elements identical or similar to those shown previously are denoted by the same reference signs as the previously shown elements, and thus repetitive detailed descriptions of them may be omitted as appropriate.

Figure 1:
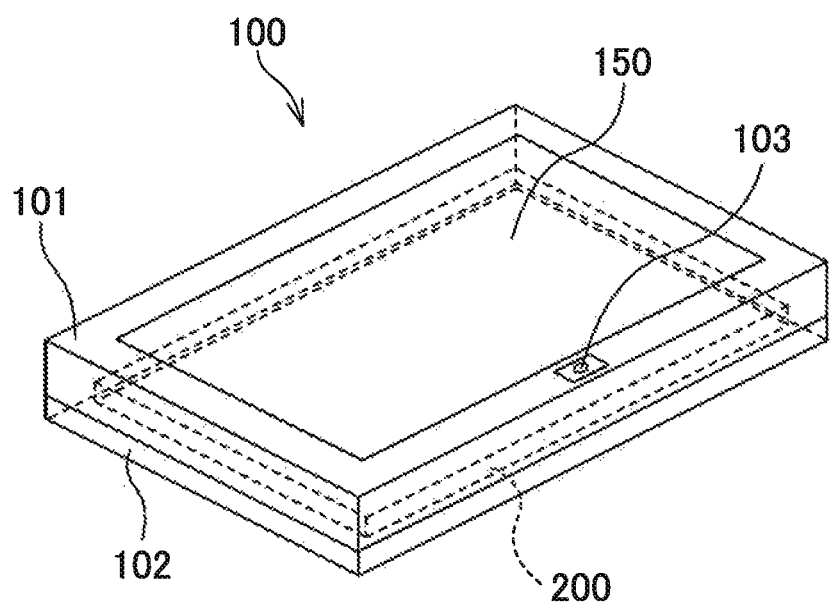
FIG. 1 is a diagram schematically showing a liquid crystal display device according to an embodiment of the present invention.

FIG. 1 schematically shows a liquid crystal display device 100 according to an embodiment of the present invention. As shown in the diagram, the liquid crystal display device 100 includes a display panel 150, a backlight unit 200 that illuminates the display panel 150 from behind, a lower frame 102 housing the backlight unit 200, and an upper frame (metal frame) 101 made of metal. The liquid crystal display panel 150 controls the orientation of a liquid crystal material sandwiched between two substrates to control the transmission of light. The upper frame 101 is fixed to cover the edge of the display panel 150. The upper frame 101 has a recess 103 that is formed in one portion of the upper frame 101.

The display panel 150 may be a well-known or suitable liquid crystal display panel that controls the orientation of a liquid crystal material by what is called an in-plane switching (IPS) or other systems. Whereas this embodiment is described by showing the liquid crystal display device 100 as an example, the present invention can be applied to display devices, such as organic EL display devices and MEMS display devices, that use another display panel combining two substrates. In this case, the invention may be practiced without using the backlight unit 200 and/or the lower frame 102 depending on the characteristics of the display panel.

Figure 2:
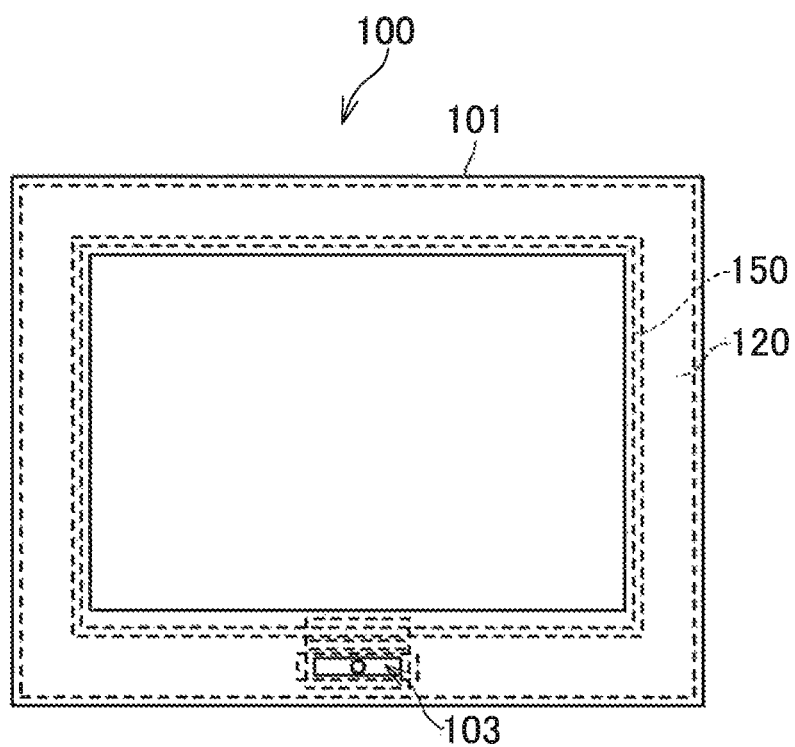
FIG. 2 is a plan view of the liquid crystal display device and shows an arrangement of a recess.
Figure 3:
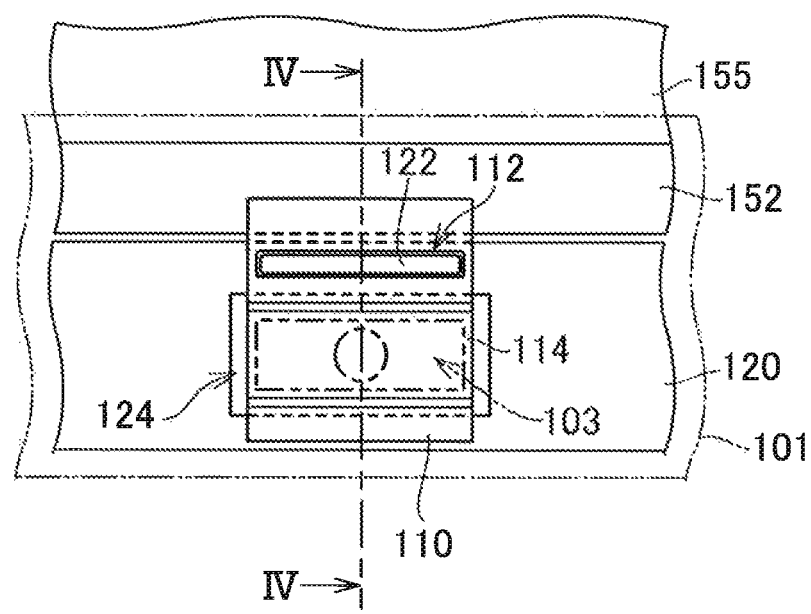
FIG. 3 is an enlarged view of and around the recess shown in FIG. 2.
Figure 4:
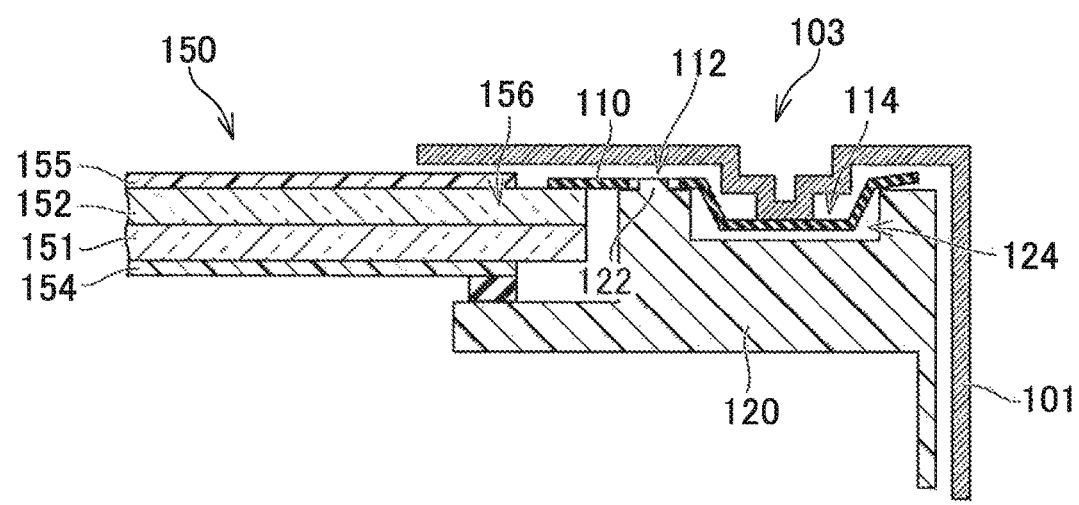
FIG. 4 is a diagram schematically showing a partial cross section taken along line IV-IV in FIG. 3.

FIG. 2 is a plan view of the liquid crystal display device 100 and shows an arrangement of the recess 103. FIG. 3 is an enlarged view of and around the recess 103 shown in FIG. 2. In FIG. 3, the recess 103 of the upper frame 101 is indicated by two-dot chain lines. FIG. 4 is a diagram schematically showing a partial cross section taken along line IV-IV in FIG. 3.

As shown in FIG. 2, the recess 103 of the upper frame 101 is formed in one portion of what is called the frame area. As shown in FIG. 4, the display panel 150 in this embodiment includes a TFT substrate 151, a transparent counter substrate 152 of insulation disposed on the TFT substrate 151, and a liquid crystal material filled between these substrates. The TFT substrate 151 includes a transparent insulating substrate and a TFT circuit formed on the insulating substrate. The counter substrate 152 has a pair of opposing long sides. In addition, polarizing plates 154 and 155 are respectively disposed on the bottom of the TFT substrate 151 and on the top of the counter substrate 152. The display panel 150 is placed and fixed on a mold frame 120 made of a resin. The upper frame 101 is placed over an edge 156 of the display panel 150 and the mold frame 120 to cover them.

Moreover, as shown in FIGS. 3 and 4, a conductive rubber cushion 110 made from a mixture of a rubber material and conductive materials, such as carbon and metal, lies astride an edge portion of the counter substrate 152 and the mold frame 120. The conductive rubber cushion 110 is attached to both the counter substrate 152 and the mold frame 120 with a conductive adhesive. The conductive rubber cushion 110 is disposed to overlap with the center of the long side of the counter substrate 152. A transparent conductive film, such as ITO or indium zinc oxide (IZO), is formed on the counter substrate 152 and is in contact with the conductive rubber cushion 110 via the conductive adhesive. The upper frame 101 has the recess 103. A first surface of the recess 103 is lower than its surrounding. A second surface of the recess 103 is higher than its surrounding to be in contact with the conductive rubber cushion 110. In this embodiment, the mold frame 120 has a mold recess 124 on a portion corresponding to the recess 103, and the conductive rubber cushion 110 also has, between the recess 103 and the mold recess 124, a cushion recess 114 that is in contact with the recess 103 under pressure from the recess 103. However, the mold recess 124 of the mold frame 120 and the cushion recess 114 of the conductive rubber cushion 110 are not necessarily required. For example, the conductive rubber cushion 110 may be flat and be disposed on a flat surface of the mold frame 120 only if the conductive rubber cushion 110 is in contact with the recess 103. The conductive rubber cushion 110 in contact with both the counter substrate 152 and the upper frame 101 can maintain the transparent conductive film formed on the counter substrate 152 at a fixed potential (e.g., ground potential) of the upper frame 101. The conductive rubber cushion 110 can be easily attached only with the conductive adhesive before placement of the upper frame 101. Thus, static electricity generated in the counter substrate 152 can be removed more easily and stably.

Figure 5:
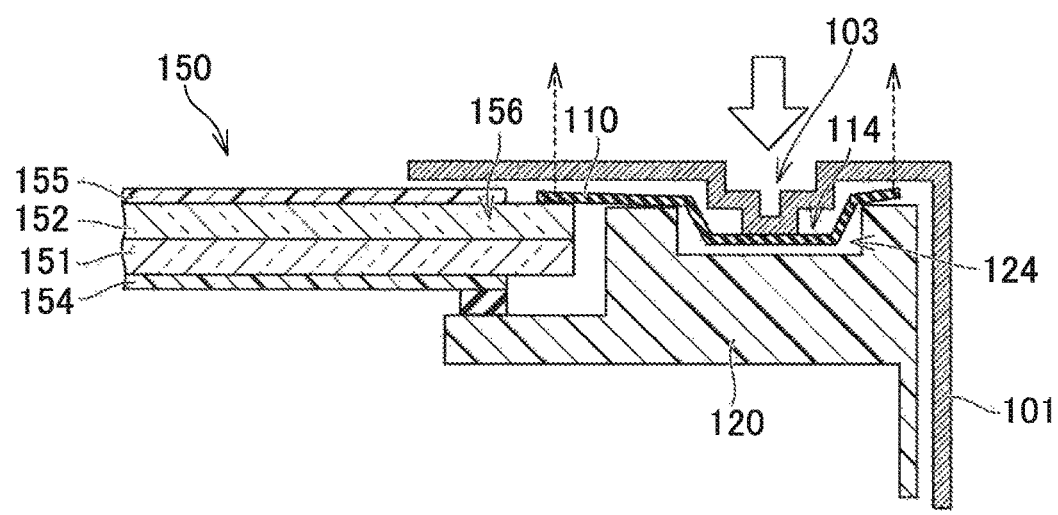
FIG. 5 is a diagram showing a modification of the embodiment of the present invention.

The conductive rubber cushion 110 in this embodiment further has an opening 112 between the recess 103 of the upper frame 101 and the counter substrate 152, more specifically, between the cushion recess 114 and the portion in contact with the counter substrate 152, of the conductive rubber cushion 110. For example, FIG. 5 shows a configuration without the opening 112 according to a modification of the embodiment of the present invention. As shown in FIG. 5, the downward pressure from the recess 103 applies upward forces to the edge of the conductive rubber cushion 110 with the edge of the mold recess 124 as a support. These upward forces weaken the contact especially with the counter substrate 152 and thus make the conductive rubber cushion 110 likely to be detached. By contrast, the opening 112 shown in FIGS. 3 and 4 can relieve stress by the pressure to reduce the stress transmitted to the edge of the conductive rubber cushion 110, accordingly keeping the conductive rubber cushion 110 in contact with the counter substrate 152 more stably. Thus, the static electricity generated in the counter substrate 152 can be removed more stably by adding the opening 112. The conductive rubber cushion 110 in this embodiment is made from a mixture of a rubber material and conductive materials, such as carbon and metal. The conductive rubber cushion 110, however, does not necessarily have cushioning properties and may be a conductive plate member made of a conductive material, for example, containing only a metal material.

Moreover in this embodiment, the mold frame 120 may have a protrusion 122 that extends through the opening 112. The protrusion 122 prevents the conductive rubber cushion 110 from moving, and especially from being detached by moving under the influence of temperature and humidity. Thus, the static electricity generated in the counter substrate 152 can be removed more stably.

Whereas the conductive rubber cushion 110 in this embodiment has the opening 112 as shown in FIG. 4, the conductive rubber cushion 110 may not have the opening 112 as shown in the modification of FIG. 5 when the stress by the pressure is not so large or when not much force is applied to the conductive rubber cushion 110 in a direction away from the counter substrate 152. Even in such a case, the transparent conductive film on the counter substrate 152 is in contact with the upper frame 101 via the conductive rubber cushion 110. Thus, the static electricity generated in the counter substrate 152 can be removed more easily and stably.

Whereas this embodiment is described above by showing the liquid crystal display device 100 as an example, the present invention can be applied to other display devices, such as organic EL display devices and MEMS display devices, that have a display panel including a TFT substrate and a counter substrate.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device comprising:
   a display panel including a thin film transistor substrate and a counter substrate having a transparent conductive film formed on the counter substrate;
   a mold frame including a display panel housing area in which the display panel is provided, a frame area outside of the display panel housing area, and a first recess in the frame area, an upper edge of the first recess having a rectangular opening in a plan view from a viewer side of the display panel;
   a conductive rubber cushion astride the counter substrate and the mold frame at the first recess, the conductive rubber cushion being attached to both the counter substrate and the mold frame; and
   a metal frame made of metal, the metal frame covering an edge of the display panel and the mold frame from above the conductive rubber cushion in a plan view, wherein
   a size of a surface area of the rectangular opening is smaller than that of the display panel,
   the metal frame has a second recess in a surface, wherein the second recess provides a projection of the metal frame, the projection is configured to be in contact with the conductive rubber cushion, and the conductive rubber cushion has a first portion in the first recess and a second portion located above the rectangular opening, with the projection of the metal frame pressing the first portion into the first recess, the projection having a stepwise shape hanging down from at least two edges of the second recess toward a bottom of the first recess, the first portion being in contact with only a bottom surface of the projection in the first recess, and the second portion being in contact with two edges of the rectangular opening.

2. The display device according to claim 1, wherein the conductive rubber cushion has an opening between the second recess and the counter substrate in a plan view.

3. The display device according to claim 2, wherein the mold frame has a protrusion extending through the opening.

4. The display device according to claim 1, wherein the first recess of the mold frame is configured to overlap with the second recess of the metal frame.

5. The display device according to claim 4, wherein the conductive rubber cushion has a cushion recess between the first recess and the second recess.

6. A display device comprising:

a display panel including a thin film transistor substrate and a counter substrate having a transparent conductive film on the counter substrate;

a mold frame including a display panel housing area in which the display panel is placed, a frame area outside of the display panel housing area, and a first recess in the frame area, an upper edge of the first recess having a rectangular opening in a plan view from a viewer side of the display panel;

a conductive cushion astride the counter substrate and the mold frame at the first recess, the conductive cushion being attached to both the transparent conductive film of the counter substrate and the mold frame; and a metal frame covering an edge of the display panel, the mold frame, and the cushion, wherein a size of surface area of the rectangular opening is smaller than that of the display panel, the counter substrate has a pair of opposing long sides, the conductive cushion is disposed to overlap with the center of the long side, the metal frame has a second recess that provides a projection of the metal frame, the projection being configured to be in contact with the conductive cushion, and the conductive cushion has a first portion in the first recess and a second portion located above the rectangular opening, with the projection of the metal frame pressing the first portion into the first recess, the projection having a stepwise shape hanging down from at least two edges of the second recess toward a bottom of the first recess, being in contact with only a bottom surface of the projection in the first recess, the second portion being in contact with two edges of the rectangular opening.

7. The display device according to claim 6, wherein the conductive cushion has an opening at a position between the second recess and the counter substrate.

8. The display device according to claim 7, wherein the mold frame has a protrusion extending through the opening.

9. The display device according to claim 6, wherein the first recess of the mold frame is configured to overlap with the second recess of the metal frame.

10. The display device according to claim 9, wherein the conductive cushion has a cushion recess between the first recess and the second recess.

* * * * *